Sept. 25, 1923.  
C. W. HOTTMANN  
1,468,967  
MIXING AND CUTTING MACHINE  
Filed May 31, 1923 2 Sheets-Sheet 1
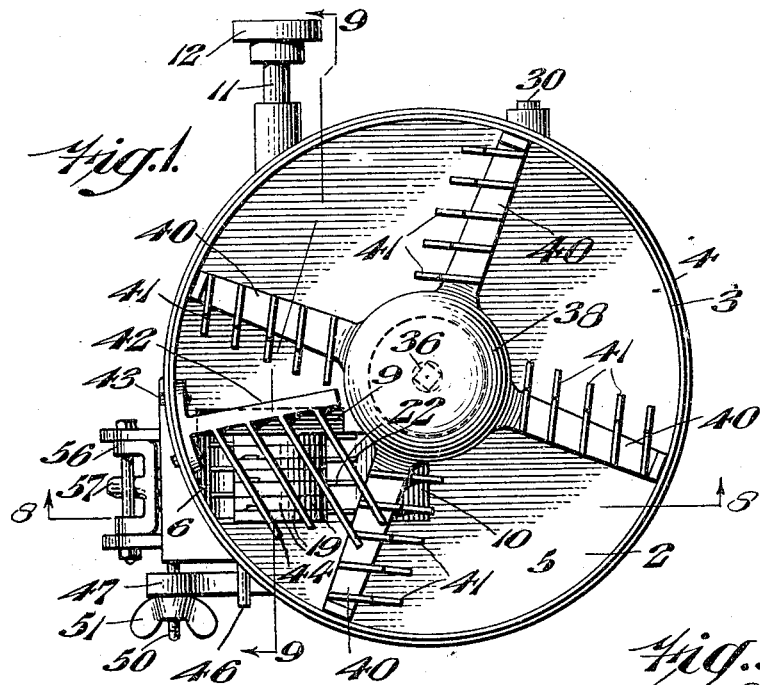
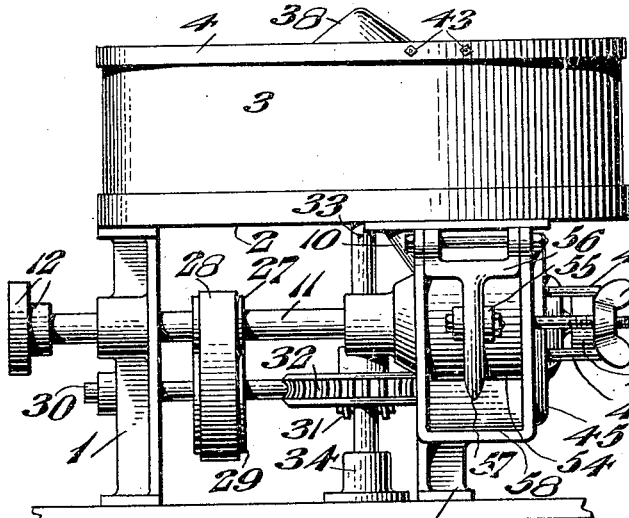
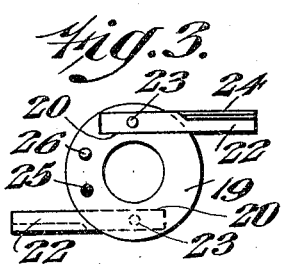
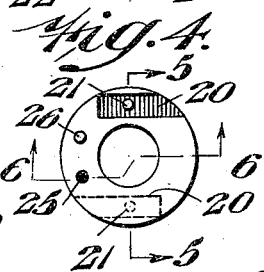
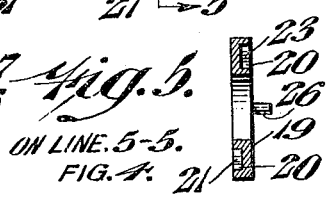
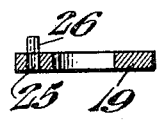
INVENTOR:  
Charles W. Hottmann  
BY  
ATTORNEYS.

Sept. 25, 1923.
C. W. HOTTMANN
1,468,967
MIXING AND CUTTING MACHINE
Filed May 31, 1923   2 Sheets-Sheet 2
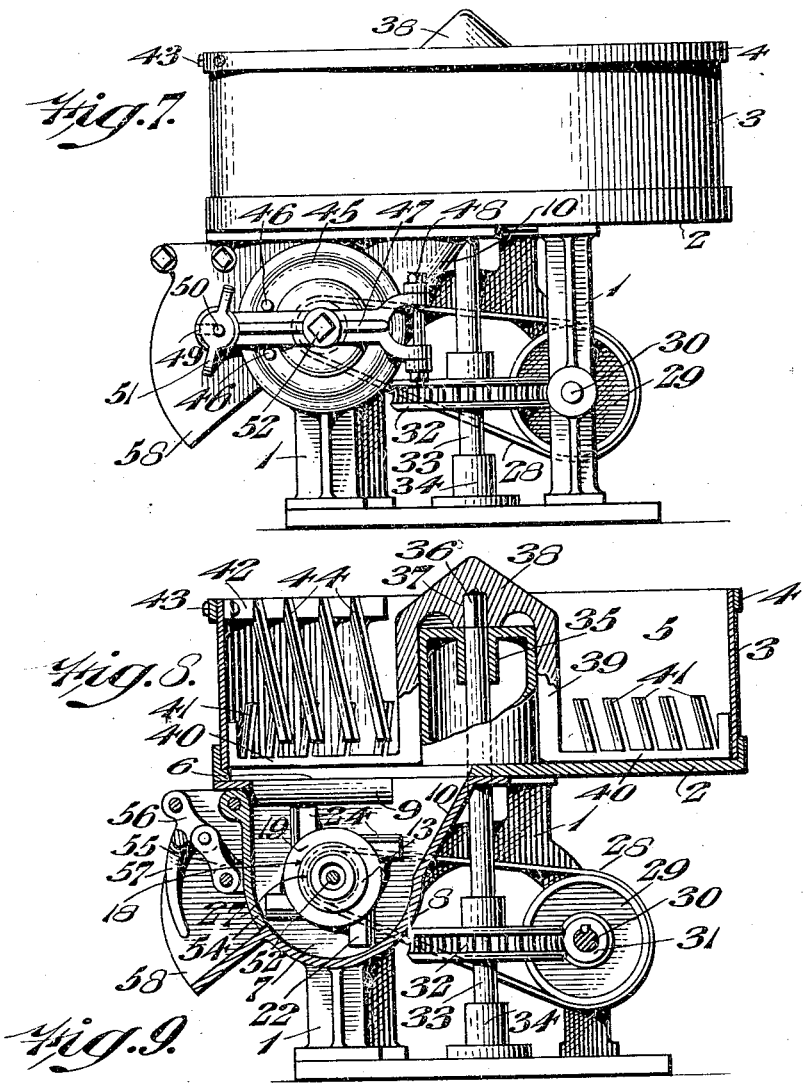
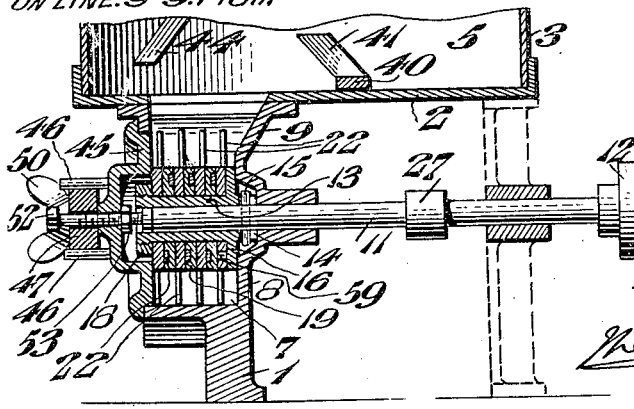
INVENTOR:
Charles W. Hottmann.
BY
ATTORNEYS.

Patented Sept. 25, 1923.

1,468,967

UNITED STATES PATENT OFFICE.

CHARLES W. HOTTMANN, OF PHILADELPHIA, PENNSYLVANIA.

MIXING AND CUTTING MACHINE.

Application filed May 31, 1923. Serial No. 642,660.

*To all whom it may concern:*

Be it known that I, CHARLES W. HOTTMANN, a citizen of the United States, residing at Philadelphia, county of Philadelphia, State of Pennsylvania, have invented a new and useful Mixing and Cutting Machine, of which the following is a specification.

The object of my present invention is to devise a novel construction and arrangement of a mixing and cutting machine which can be easily cleaned and maintained in a sanitary condition, and wherein novel means are employed to effect the feed of the material in the mixing chamber, and wherein a novel construction and arrangement of cutting mechanism is employed.

It further comprehends novel mixing mechanism, novel cutting mechanism and novel means for feeding the material and for effecting its discharge from the machine.

It further comprehends a novel construction and arrangement of a stationary container, novel means for effecting the feed of the material therein, a novel construction and arrangement of a cutting chamber having a single opening communicating with the mixing chamber serving as an inlet and outlet, a novel construction and arrangement of a casing contributing to form the cutting chamber and having a portion of its wall removable to cause the material to be fed during discharge directly to a discharge spout or outlet.

It further comprehends a novel construction of cutters and novel means for assembling them.

Other novel features of construction and advantage will hereinafter more fully appear in the detailed description and the appended claims.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of a mixing and cutting machine, embodying my invention.

Figure 2 represents a side elevation thereof.

Figure 3 represents, in elevation, one of the cutter discs and their knives.

Figure 4 represents, in elevation, the disc seen in Figure 3 with the knife removed.

Figure 5 represents a section on line 5—5 of Figure 4.

Figure 6 represents a section on line 6—6 of Figure 4.

Figure 7 represents, in front elevation, the mixing and cutting machine.

Figure 8 represents a section on line 8—8 of Figure 1.

Figure 9 represents a section on line 9—9 of Figure 1.

Figure 10 represents a top plan view of a bushing employed on which the knife discs or supports are carried.

Similar numerals of reference indicate correspondng parts.

Referring to the drawings.

1 designates the supporting framework, the construction and arrangement of which may vary widely in practice and which for ease of assemblage is preferably made in sections.

The supporting framework 1 carries the bottom 2 of a casing 3 which may be reinforced, if desired, at its upper portion by means of a band 4. This casing is provided with a mixing chamber 5 which communicates by means of a combined inlet and discharge port 6 with the cutting chamber 7 formed within a casing 8 supported by the framework and connected with the bottom member 2 of the casing 1 in any desired manner. The cutting chamber 7 has a portion of its wall in proximity to the port 6 downwardly inclined or bevelled, as indicated at 9, and a wall 10 of the casing 8 diverges outwardly and upwardly towards the combined inlet and discharge port 6.

11 designates the main driving shaft which also carries the cutting mechanism, and this shaft is suitably journalled in the supporting framework and is provided with pulleys 12, in order to adapt it to be connected with a suitable source of power.

13 designates a bearing sleeve which carries the knife support and this sleeve is fixed to the shaft 11. As illustrated, the sleeve is provided with a slot 14, see Figure 10, through which passes a pin 15, see Figure 9. The sleeve 13 is provided with an annular shoulder 16 which bears against the juxtaposed wall of the cutting chamber 7. The sleeve at its outer end is threaded, as indicated at 17, in order to receive a nut 18 which serves to retain in assembled position the knife supports 19. Each knife support is recessed on opposite sides, as indicated at 20, and extending from the bottom wall of each recess is a pin 21 which serves to retain in position its respective knife 22 which is apertured, as at 23, in order to receive the pin 21. Each knife 22 fits snugly in its recess 20 and each knife is provided with a cutting edge 24 which preferably is straight, as illustrated. Each knife support 19 is provided with an aperture 25 and with a pin 26, the arrangement of which will be best understood from Figures 3 and 4.

The shaft 11 has fixed thereto a pulley 27 around which passes a belt 28 which also passes around a pulley 29 carried by a shaft 30 suitably journalled in the machine frame. The shaft 30 has fixed to it a gear 31 which meshes with a gear 32 on a vertically disposed shaft 33, the lower end of which latter is mounted in a stepped bearing 34. The shaft 33 is journalled near its upper end in a bearing 35 formed by a central annular portion of the casing 3 and the free end of the shaft 33 has a polygonal contour, as indicated at 36, in order to adapt it to engage a correspondingly shaped recess in the head 38 of the material feeding mechanism. This head preferably tapers downwardly and merges into the vertically disposed members 39 which merge into the bottom members 40 which latter carry the inclined feed members or blades 41 which extend upwardly.

42 designates a material arresting member which is secured to the casing 3 by a fastening device 43 and this material arresting member is provided with the forwardly and downwardly inclined bars 44.

The outer wall of the casing 8 is provided with a removable closure 45 having guide members 46, as illustrated, in the form of pins, and which serve to guide a bar 47 which is hinged, at 48, and at its free end it is recessed as at 49, in order to pass over the threaded rod 50 fixedly supported, and a thumb nut 51 is provided to engage the threaded rod 50 and lock the bar 47 and thereby the closure 45 in its closed position. The bar 47 is fixed to the closure 45 by means of a threaded bolt 52 which is provided with a nut 53 and the inner end of said bolt preferably bears against the juxtaposed end of the main driving shaft 11.

54 designates a pivotally mounted door which forms a wall of the cutting chamber and to this door or gate is connected one end of a link 55, the opposite end of which is connected to a link 56 pivotally supported at one end and provided with an actuating handle 57. The material from the cutting chamber when the door or gate 54 is open passes into the delivery chute or spout 58. The annular shoulder 16, see Figures 9 and 10, is provided with a laterally extending pin 59 which is adapted to engage an aperture 25 in the juxtaposed knife support 19 so that all of the knife supports 19 will be interlocked with each other and with the sleeve 13 which is fixed to the shaft 11 in order to revolve in unison therewith.

The operation of my novel mixing and cutting machine will now be apparent to those skilled in this art and is as follows:—

The mixing chamber is stationary and the material to be mixed and cut is placed in the chamber 5. Assuming now that the main driving shaft 11 is revolving, it will be apparent that the cutting knives 22 will revolve in unison therewith. Due to the provision of the pins 26 and the apertures 25, it will be apparent that when the knife supports are assembled, as described, the different knives will have a staggered arrangement so that they will be properly spaced from each other circumferentially around the sleeve 13 on which they are carried. A belt 28 which is driven from the pulley 27 drives the pulley 29 which is fixed to the shaft 30.

As the shaft 30 is intergeared with the shaft 33, the latter will be revolved and thereby the material feeding mechanism. The arrangement is such that the cutting mechanism revolves at the same speed as that of the main driving shaft 11 and the material feeding mechanism revolves at a comparatively slow speed. As the shaft 33 revolves, it carries with it the head 38, the downwardly extending members 39, the bottom seating members 40 and the inclined feeding blades 41 so that the material within the chamber 5 will be fed towards the combined inlet and discharge opening 6 and will pass down the inclined wall 9 into the cutting chamber 7. The feed blades 41 pass between or on one side of the material arresting bars 44 so that the material will pass into the cutting chamber 7 and will be acted upon by the knives 22 which make what is called a shear cut. The material cut then passes up the inclined wall 10 through the discharge portion of the opening 6 and into the chamber 5 so that it is recirculated through the mixing chamber 5 and passes again to the cutting mechanism as before described. Any additional material can be placed in the mixing chamber 5 during the operation of the machine as well as any condiments or flavoring material.

As soon as the material has been cut and mixed to the desired degree of fineness the handle 57 is actuated to open the door or gate 54 and the material discharges through the delivery spout 58 to a desired receptacle, not shown.

My present machine can be maintained in a sanitary condition at all times since by opening the closure 45 and unscrewing the nut 18 the cutting blades and their support can be removed and whenever desired the material feeding mechanism in the mixing chamber 5 can be removed. The cutting mechanism, the feeding mechanism, the mixing chamber 5 and the cutting chamber 7 can then be readily cleaned and sterilized by hot water or steam.

Special attention is directed to the fact that in my present invention the stationary mixing chamber has an opening in its bottom which forms a combined inlet and outlet port and the cutting mechanism is located directly beneath such combined port and the material which is to be cut and mixed is circulated to and from such port. The cutting mechanism is mounted on the main driving shaft so that it can be operated at a high speed and the material circulating members can be operated at a much lower speed.

It will now be apparent that I have devised a new and useful mixing and cutting machine which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In a mixing and cutting machine, a casing having a mixing chamber, a cutting chamber and a combined inlet and discharge port communicating with said chambers, means to effect the circulation of the material in said mixing chamber, and cutting mechanism for said cutting chamber.

2. A mixing and cutting machine, a casing having a mixing chamber, a cutting chamber, and a combined inlet and discharge port opening through the bottom of the mixing chamber and communicating with the cutting chamber, means to effect the circulation of the material in said mixing chamber, and cutting mechanism for said cutting chamber.

3. In a mixing and cutting machine, a stationary casing having a mixing chamber and an aperture through its bottom and provided with a cutting chamber beneath said aperture, material arresting mechanism in said mixing chamber, feeding mechanism in said mixing chamber, a main driving shaft, cutters actuated thereby, and means operatively connecting said main driving shaft and said feeding mechanism to actuate the latter.

4. In a mixing and cutting machine, a stationary casing having a combined inlet and discharge port in its bottom and having a cutting chamber communicating with said port, a main driving shaft, interlocking knife supports carried thereby, knives carried by said supports, and material feeding mechanism in said mixing chamber operatively connected with said driving shaft to be driven by it.

5. In a machine of the character described, a main driving shaft, a sleeve mounted thereon, interlocking knife supports one of which is interlocked with said sleeve, knives carried by said supports, means to secure said knife supports in position on said sleeve, a cutting casing having a cutting chamber in which said knife support and knives are mounted, means to feed material to said cutting chamber, and means to effect the discharge of the cut material from said chamber.

6. In a device of the character described, a casing having a mixing chamber and a cutting chamber communicating therewith, means to feed the material in said mixing chamber, means to arrest the feed of material in proximity to the communication between said chambers, cutting mechanism in said cutting chamber and including knives circumferentially spaced from each other and having straight cutting edges.

7. In a device of the character described, a casing having a mixing chamber and a cutting chamber, said mixing chamber communicating through its bottom with said cutting chamber, said cutting chamber having a portion of its wall formed by a manually actuated door, a main driving shaft extending into said cutting chamber, cutting knives in said cutting chamber actuated by said driving shaft, and material feeding mechanism in said mixing chamber and operatively connected with said driving shaft to be driven by it.

8. In a device of the character described, a casing having a cutting chamber, a driving shaft extending into said cutting chamber, cutting mechanism in said chamber actuated by said shaft, said casing having a portion of its wall removable, a pivoted member by means of which said wall is carried, means to lock said member in closed position, and an adjustable member mounted in said removable portion and adapted to bear against the end of said driving shaft.

9. In a device of the character described, a casing having a cutting chamber, a driving shaft, a sleeve fixed thereto to revolve in unison therewith, knife supports on said sleeve, each knife support having a recess, a knife secured in said recess, means cooperating with said sleeve to secure said knife supports in position, and said casing having a controllable discharge outlet from said cutting chamber.

10. In a device of the character described, a casing having a cutting chamber, a driving shaft, a plurality of knife supports operatively connected therewith, and knives carried by said knife supports, each of said knife supports having an aperture and an outwardly extending pin circumferentially spaced from each other, whereby the pin of one knife support will be received in the aperture of an adjacent knife support to circumferentially space the knives of said supports.

CHARLES W. HOTTMANN.

Witnesses:
H. S. FAIRBANKS,
F. A. NEWTON.